United States Patent
Takemoto

(10) Patent No.: US 7,379,096 B2
(45) Date of Patent: May 27, 2008

(54) IMAGE PROCESSING METHOD FOR PROCESSING IMAGE DATA BASED ON CONDITIONS CUSTOMIZED FOR EACH USER

(75) Inventor: Fumito Takemoto, Kaisei-machi (JP)

(73) Assignee: Fuji Photo Film, Co., Ltd., Kanagawa-ken (JP)

( * ) Notice: Subject to any disclaimer, the term of this patent is extended or adjusted under 35 U.S.C. 154(b) by 471 days.

(21) Appl. No.: 09/842,922

(22) Filed: Apr. 27, 2001

(65) Prior Publication Data

US 2002/0021360 A1 Feb. 21, 2002

(30) Foreign Application Priority Data

Apr. 28, 2000 (JP) .............................. 2000-130602
Mar. 21, 2001 (JP) .............................. 2001-080255

(51) Int. Cl.
*H04N 5/235* (2006.01)
*H04N 5/89* (2006.01)

(52) U.S. Cl. ..................... 348/222.1; 348/40
(58) Field of Classification Search ................ 355/40; 348/222.1, 40
See application file for complete search history.

(56) References Cited

U.S. PATENT DOCUMENTS 5,917,578 A * 6/1999 Nakamura ................... 355/40
6,222,613 B1 * 4/2001 Haraguchi et al. ............ 355/40
6,710,896 B1 * 3/2004 Takaoka ..................... 358/1.9
2002/0057460 A1 * 5/2002 Shiota et al. ............... 358/302
2003/0189730 A1 * 10/2003 Enomoto .................... 358/3.26

FOREIGN PATENT DOCUMENTS

JP          11234523          8/1999

* cited by examiner

Primary Examiner—James M. Hannett
(74) Attorney, Agent, or Firm—Birch, Stewart, Kolasch & Birch, LLP

(57) ABSTRACT

Preference of tone and color for a specific target is reflected on image data obtained by a digital camera, and colors and tones can be set as desired for each model of a digital camera. A reference tone setting menu and a model tone setting menu are prepared in a memory and can be customized when provided to tone setting device. Color correction device can also select and customize a desired one of reference color correction conditions and a desired one of model color correction conditions from a reference color correction menu and a model color correction menu prepared in a memory.

11 Claims, 9 Drawing Sheets

FIG.5A

EXAMPLE OF REFERENCE COLOR CORRECTION CONDITIONS

|        | L | C  | H  |
|--------|---|----|----|
| R      | 0 | -5 | -3 |
| G      | 0 | 0  | 0  |
| B      | 0 | 0  | 0  |
| C      | 0 | 0  | 0  |
| M      | 0 | 0  | 0  |
| Y      | 0 | 0  | 0  |
| YG     | 0 | 0  | 0  |
| BS     | 0 | 0  | 0  |
| SK(HL) | 0 | 0  | 0  |
| SK(MD) | 0 | 0  | 0  |
| SK(SD) | 0 | 0  | 0  |

FIG.5B

EXAMPLE OF MODEL COLOR CORRECTION CONDITIONS (DIGITAL DAMERA A)

|        | L | C  | H  |
|--------|---|----|----|
| R      | 0 | -2 | -5 |
| G      | 0 | 0  | 0  |
| B      | 0 | -3 | 0  |
| C      | 0 | 0  | 0  |
| M      | 0 | 0  | 0  |
| Y      | 0 | 3  | 0  |
| YG     | 0 | 0  | 0  |
| BS     | 0 | 0  | 10 |
| SK(HL) | 0 | 0  | 0  |
| SK(MD) | 0 | 0  | 0  |
| SK(SD) | 0 | 0  | 0  |

FIG.8

SHARPNESS GAIN SETTING MENU

| GAIN | $\beta$ |
|---|---|
| 50 | 0.5 |
| 100 | 1.0 |
| 150 | 1.5 |
| ⋮ | ⋮ |

IMAGE PROCESSING METHOD FOR PROCESSING IMAGE DATA BASED ON CONDITIONS CUSTOMIZED FOR EACH USER

BACKGROUND OF THE INVENTION

1. Field of the Invention

The present invention relates to an image processing condition setting method for setting image processing conditions for image data obtained by a digital camera. The present invention also relates to an image processing method, an image processing apparatus and a computer-readable recording medium storing a program to cause a computer to execute the image processing method.

2. Description of the Related Art

A digital camera can record an image obtained by photographing, as digital image data in an internal memory installed in a digital camera or in a recording medium such as an IC card. Based on the digital image data recorded in the above manner, the image can be displayed by using a printer or a monitor. In the case where an image obtained by a digital camera is printed, the print is expected to have as high a quality as a photograph generated from a negative film.

Therefore, tone correction processing and color correction processing is generally carried out on image data obtained by a digital camera. Since each model of digital camera has different characteristics of tones, density, colors and the like, it is necessary for processing conditions corresponding to an individual model to be acquired for image data obtained by a camera of that model, in order to obtain reproduced images having a uniform quality. The above characteristics depending on the model of the camera are then corrected by using the processing conditions.

Meanwhile, in the field of printing, a system for outputting a reproduced image as a hard copy from a printer by reading a color image with a scanner to obtain input image data and by carrying out a desired kind of image processing on the input image data has been put into practice (Japanese Unexamined Patent Publication No. 11(1999)-234523, for example). In such a system, the input image data are converted from RGB color signals into CMYK dot % signals. First, a tone curve and a color correction amount used in a color correction unit are determined for the input image data, and a three-dimensional look-up table (hereinafter called 3DLUT) for converting the input image data into output image data is generated based on the tone curve and the color correction amount. The RGB color signals of the image data are converted into the CMYK dot % signals of the output image data by interpolating the 3DLUT. Printing is carried out by controlling an amount of ink for each color using the dot % signals.

As has been described above, when image data obtained by a digital camera are output, tone correction processing and color correction processing is also carried out. High-quality images are also expected in this case, by setting conditions for the tone correction processing and the color correction processing for each image, as in the system for printing.

Meanwhile, preference for a specific target in a printed image varies. Especially, preference for reproduction of skin color and gray varies between Japan and the Unites States or Europe. Therefore, conditions for tone correction processing, color correction processing, and the like need to be changed as desired in some cases. Furthermore, adjustment of correction processing conditions for tones, density, and colors for a specific model of a digital camera is desired separately from adjustment of the above processing conditions that are common among digital cameras so that a desired kind of image processing can be carried out on image data obtained by the digital camera.

SUMMARY OF THE INVENTION

The present invention has been conceived based on consideration of the problems described above. An object of the present invention is therefore to provide an image processing condition setting method for flexibly and conveniently carrying out processing such as tone correction, density correction, and color correction on image data obtained by a digital camera, and to provide an image processing method, an image processing apparatus, and a computer-readable recording medium storing a program to cause a computer to execute the image processing method.

An image processing method of the present invention is a method for obtaining processed image data by carrying out image processing on image data obtained by a digital camera, according to default processing conditions and processing conditions corresponding to a model of the digital camera. The image processing method comprises the step of customizing the default processing conditions and/or the processing conditions corresponding to the model of the digital camera.

The "default processing conditions" refer to image processing conditions set in common for all models of digital camera, regardless of a model of each digital camera. More specifically, the default processing conditions refer to tone correction conditions, density correction conditions, color correction conditions (hereinafter, respectively called reference tone correction conditions, reference density correction conditions, and reference color correction conditions) and a gain of sharpness processing, for example.

The "processing conditions corresponding to a model of the digital camera" refer to processing conditions for correcting characteristics peculiar to the model of the digital camera (hereinafter called model processing conditions), such as tone characteristics, density characteristics, or color characteristics of the digital camera represented in the image data obtained by the digital camera (hereinafter respectively called model tone characteristics, model density characteristics, and model color characteristics). More specifically, the model processing conditions refer to model tone curves for correcting the model tone characteristics of the digital camera, model density correction values, and model color correction parameters.

It is preferable for the model processing conditions to include at least one of tone correction processing conditions, density correction processing conditions, and color correction processing conditions, each corresponding to the model of the digital camera.

It is also preferable for operation by an operator to be eased by customizing the default processing conditions through generation of customized default processing condition menus in advance and selection of a desired one of the customized default processing condition menus.

Likewise, it is also preferable for the operation to be eased by customizing the model processing conditions through generation of customized model processing condition menus in advance and selection of a desired one of the customized model processing condition menus.

An image processing apparatus of the present invention is an apparatus for obtaining processed image data by carrying out image processing on image data obtained by a digital camera, according to default processing conditions and processing conditions corresponding to a model of the digital camera. The image processing apparatus comprises:

default processing condition setting means for customizing the default processing conditions;

model processing condition setting means for customizing the processing conditions corresponding to the model of the digital camera; and image processing means for carrying out the image processing based on the default processing conditions set by the default processing condition setting means and the processing conditions corresponding to the model of the digital camera set by the model processing condition setting means.

The image processing apparatus of the present invention may further comprise:

processing condition management means for providing a name to the default processing conditions set by the default processing condition setting means and/or the model processing conditions set by the model processing condition setting means, and for storing the default processing conditions and/or the model processing conditions in relation to the name thereof; and processing condition reading means for reading the default processing conditions and/or the model processing conditions managed by the processing condition management means and for providing the conditions that have been read into the image processing means.

The "name" herein referred to can be any identifier enabling identification of the default processing conditions set by the default processing condition setting means and/or the model processing conditions set by the model processing condition setting means upon storing and managing the conditions. The name can be given to the default processing conditions or the model processing conditions separately from each other, or to a set of the default processing conditions and the model processing conditions. The name can be a simple management number for the processing conditions. However, for the sake of easy user management and easy use, it is preferable for the name to contain information about a person who requested printing (or a photographer) and information of a photographing condition, such as "cloudy-weather conditions for digital camera X of user A".

It is preferable for the model processing condition setting means to customize at least one of tone correction processing conditions, density correction processing conditions, and color correction processing conditions each corresponding to the model of the digital camera.

It is also preferable for the default processing condition setting means to set the default processing conditions through selection from customized default processing condition menus generated in advance, in order to ease operation by an operator.

Likewise, it is also preferable for the model processing condition setting means to set the processing conditions corresponding to the model of the digital camera through selection from customized model processing condition menus generated in advance, in order to ease operation by the operator.

The image processing method of the present invention may be provided as a computer-readable recording medium storing a program to cause a computer to execute the image processing method.

The present invention also provides an image processing condition setting method for setting image processing conditions for image data obtained by a digital camera. The image processing condition setting method comprises the step of customizing default processing conditions and/or processing conditions corresponding to a model of the digital camera.

According to the present invention, customization of the default processing conditions and/or the model processing conditions is possible when the image processing is carried out on the image data obtained by the digital camera according to the default processing conditions and the processing conditions corresponding to the model of the digital camera. Therefore, a user can reflect his/her preference for a specific target, and flexible image processing becomes possible.

Furthermore, since the processing conditions can be customized for a digital camera of each specific model, image processing on image data obtained by a digital camera of another model is not affected, and the image processing can be freely adjusted for the camera of the specific model.

Moreover, the customized default processing condition menus and the customized model processing condition menus are generated in advance for setting the default processing conditions and the model processing conditions. By setting the default processing conditions and the model processing conditions as desired through selection from these menus, operation by an operator becomes easy and convenient, which leads to efficient image processing.

If the image processing apparatus of the present invention comprises the processing condition management means for managing the customized default processing conditions and/or the customized model processing conditions in relation to the name thereof and the processing condition reading means for reading the customized default processing conditions and/or the customized model processing conditions managed by the processing condition management means and for providing the conditions that have been read to the image processing means, only the processing conditions need to be read when image data having the same photographing condition are processed. Therefore, setting the processing conditions each time becomes unnecessary, which is efficient. If the name has the information of the person who requested printing (or the photographer) and the information of the photographing condition, the name is useful for user management and improves convenience.

BRIEF DESCRIPTION OF THE DRAWINGS

FIG. 5A and FIG. 5B respectively show examples of reference color correction conditions and model color correction conditions;

FIG. 8 shows a sharpness gain setting menu; and

DESCRIPTION OF THE PREFERRED EMBODIMENT

Hereinafter, an embodiment of the present invention will be explained with reference to the accompanying drawings.

Figure 1:
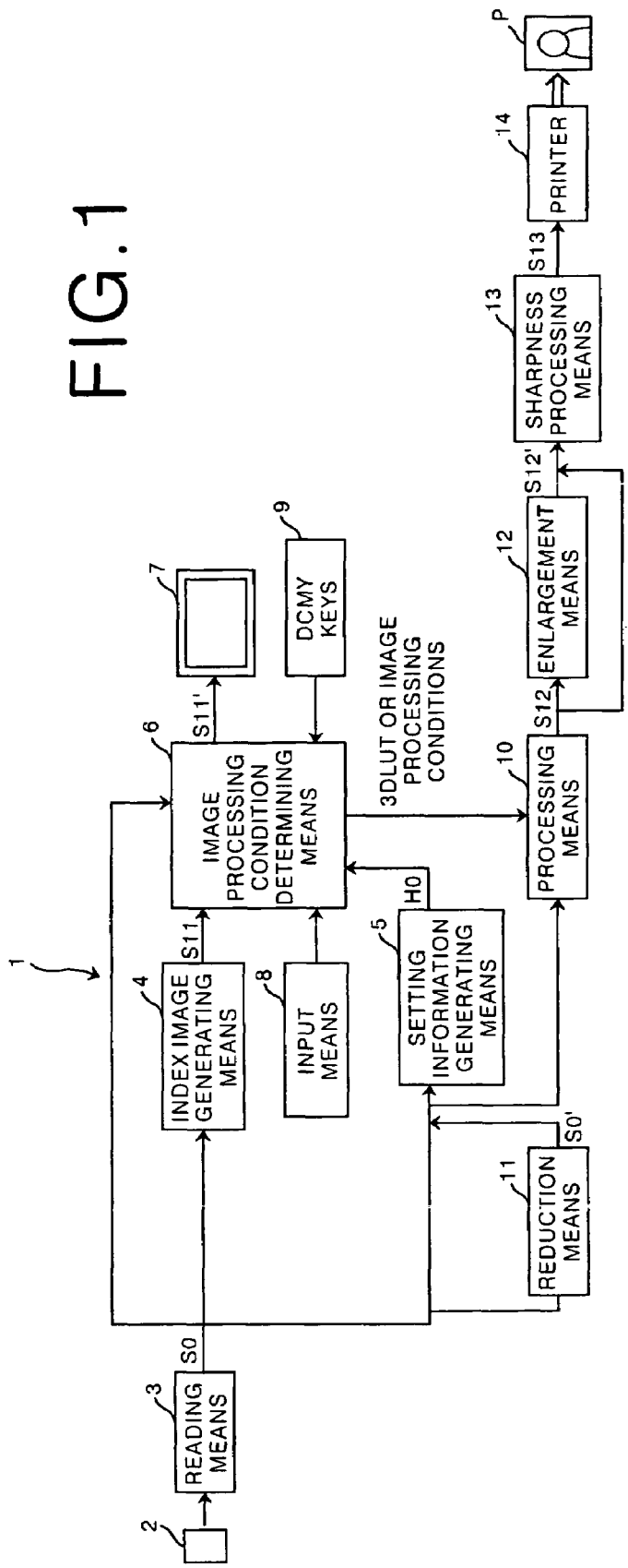
FIG. 1 is a block diagram showing a configuration of an image processing apparatus as an embodiment of the present invention.

FIG. 1 is a block diagram showing a configuration of an image processing apparatus as the embodiment of the present invention. As shown in FIG. 1, an image processing apparatus 1 in this embodiment comprises reading means 3 for reading image data S0 comprising color data R0, B0, and G0 from a memory card 2 storing the image data S0 obtained by photographing a subject by a digital camera, index image generating means 4 for generating index image data S11 representing index images by reducing the image data S0, setting information generating means 5 for generating setting information H0 necessary for setting tone conversion tables T0, which will be explained later by analyzing the image data S0, image processing condition determining means 6 for carrying out tone conversion processing and color correction processing on the index image data S11 and for setting image processing conditions used for carrying out the tone conversion processing and the color correction processing on the image data S0 upon printing the image data S0, a monitor 7 for displaying index images represented by index image data S11' after the tone conversion processing and the color correction processing, input means 8 for carrying out various kinds of input to the image processing condition determining means 6, DCMY keys 9 for changing density, processing means 10 for obtaining converted image data S12 by converting the image data S0 according to the image processing conditions set by the image processing condition determining means 6, reduction means 11 for obtaining reduced image data S0' by reducing the image data S0 in the case where the number of pixels for an image represented by the image data S0 is larger than the number of pixels for printing the image, enlargement means 12 for obtaining enlarged image data S12' by enlarging the converted image data S12 in the case where the number of the pixels is equal to or smaller than the number of the pixels for printing, sharpness processing means 13 for obtaining processed image data S13 by carrying out sharpness processing on the converted image data S12 or on the enlarged image data S12', and a printer 14 for obtaining a print P by outputting the processed image data S13.

The reading means 3 comprises a card reader and the like for reading the image data S0 from the memory card 2. Since the image data read from the memory card 2 are generally compressed, the image data S0 are obtained by decompressing the image data read from the memory card. Information indicating a model of the digital camera that obtained the image data S0 (hereinafter called camera model information) is added to the image data S0 as tag information of the image data. Therefore, the camera model information is also read. As a standard for recording the camera model information as the tag information, "Baseline TIFF Rev.6.0 RGB Full Color Image" adopted as a non-compressed file format of an Exif file can be used, for example.

The index image generating means 4 reduces the image data S0 by thinning or the like, and generates the index image data S11.

The setting information generating means 5 generates the setting information H0 in the following manner. In general, automatic exposure control processing (AE processing) and automatic white balance processing (AWB processing is carried out in a digital camera for reproduction of image data on a monitor. However, in the case where the image data are reproduced by a printer, the AE processing and the AWB processing (hereinafter called AE/AWB processing) carried out in the digital camera is not sufficient. Therefore, AE/AWB processing appropriate for the printer is necessary. The setting information generating means 5 estimates a correction amount necessary for AE/AWB processing optimal for printing for each of RGB color signals comprising the image data S0 (or the image data S0' in the case where the image data S0 have been reduced by the reduction means 11). The correction amount is included in the setting information H0. For this reason, an average of each of the RGB color signals comprising the image data S0 is found as described in Japanese Unexamined Patent Publication No. 11(1999)-220619 for example, and a correction value is determined so that the average becomes a target value for printing. The correction value is included in the setting information H0 and output. The correction value includes the correction amount for exposure and white balance.

The setting information generating means 5 finds correction amounts used for correcting highlight and shadow of tones into nonlinear forms when the image processing conditions are set by the image processing condition determining means 6 as will be explained later. These correction amounts are also included in the setting information H0. A printer generally has a narrow density reproduction range and colors easily become evenly bright in a highlight area and evenly dark in a shadow area of an image. Therefore, as described in Japanese Unexamined Patent Publication No. 11(1999)-331596, the setting information generating means 5 finds the correction amounts to harden tones of the highlight area and soften tones of the shadow area in a density space, in the case where density of a print increases by the AE processing or the AWB processing. On the other hand, in the case where the density decreases in the print, the setting information generating means 5 finds the correction amounts so that the tones of the highlight area are softened and the tones of the shadow area are hardened. The correction amounts are also included in the setting information H0.

The setting information generating means 5 reads the tag information of the image data S0. The camera model information of the tag information and the number of the pixels (hereinafter called Y0) in the image represented by the image data S0 (or the number of pixels in a reduced image S0' (hereinafter called Y0') in the case where the image data S0 have been reduced by the reduction means 11) are included in the setting information H0.

The monitor 7 displays the index images represented by the index image data S11'. At the time of correcting tone curves and color correction conditions that will be explained later, the tone curves and the color correction conditions are also displayed on the monitor together with the index images. In this embodiment, the number of index images displayed simultaneously is six.

Figure 3B:
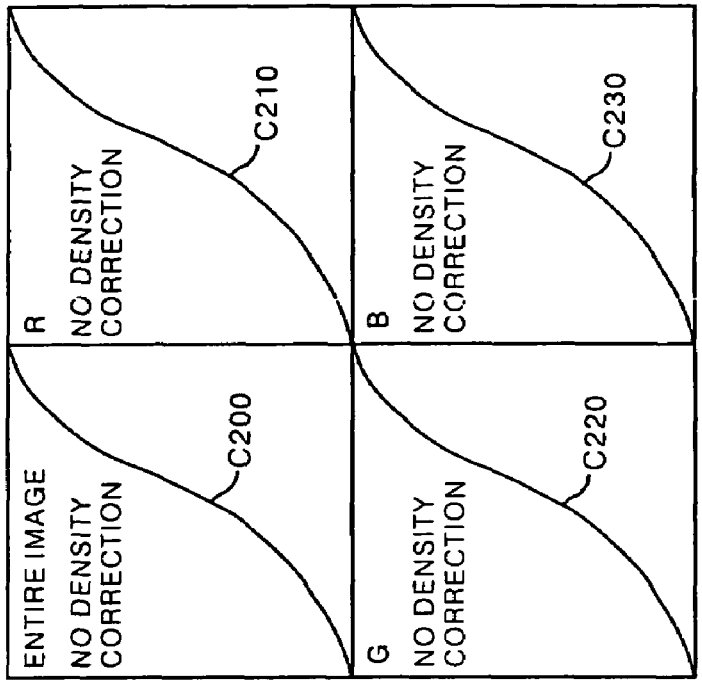
FIG. 3A and FIG. 3B respectively show examples of a reference tone setting menu and a model tone setting menu.
Figure 3A:
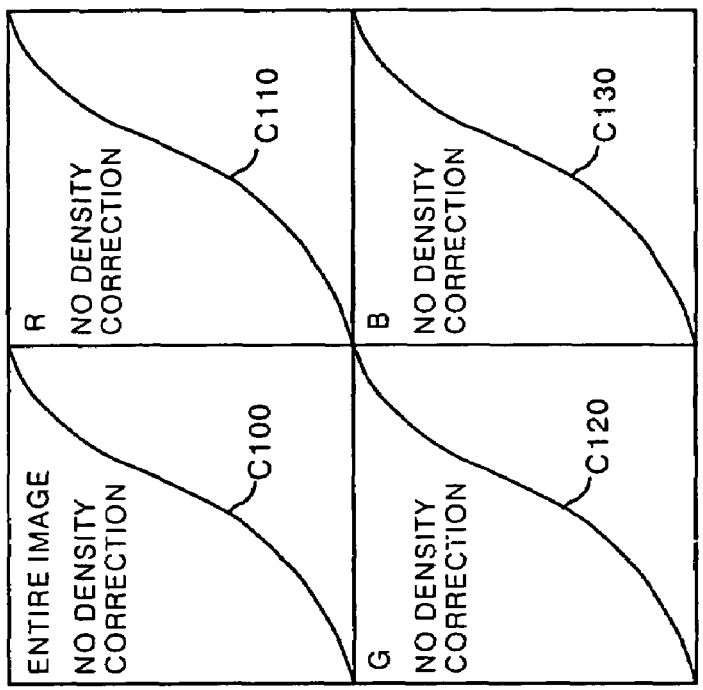

The input means 8 comprises a keyboard, a mouse and the like for carrying out various kinds of input to the image processing condition determining means 6. A type of reference tone used at the time of setting the image processing conditions (hereinafter called reference tones) is input from the input means 8. The reference tones refer to tones for carrying out the tone conversion processing on the image data to obtain the print P having appropriate tones when printing is carried out by the printer 14. As the reference tones, tones for a standard situation, tones for cloudy weather, tones for backlight, and tones for flash photographing are available. By inputting one of the types of these reference tones selected by using the input means 8, a menu for setting the reference tones corresponding to the selection is displayed. From the reference tone setting menu, reference tone correction curves representing reference tone correction processing conditions are set by the image processing condition determining means 6. For example, in the case where the tones for cloudy weather are selected, a reference tone setting menu for cloudy weather is displayed. FIG. 3A shows an example of the reference tone setting menu. As shown in FIG. 3A, the reference tone correction processing conditions comprise a reference tone correction curve C100 corresponding to the entire RGB colors, and reference tone correction curves C110, C120, and C130 for R, G, and B, respectively. By correcting the curve C100 as desired by using the reference tone setting menu shown in FIG. 3A with the input means 8, the reference tone correction curve can be set as desired for the entire RGB colors. Likewise, by correcting C110, C120 or C130, the reference tone correction curve for R, G, or B can be set as desired. By correcting the reference tone correction curves C110, C120 and C130, density and gray balance can also be adjusted.

The DCMY keys 9 comprise four keys for correcting density D of an entire image and densities of cyan (C), magenta (M) and yellow (Y), respectively. Depending on how many times each of these keys is pressed down, the density of the entire image or each of the colors can be changed by the image processing condition determining means 6. The correction of the reference tone curves C100, C110, C120, and C130 input from the input means 8 and the change of the densities input from the DCMY keys 9 are reflected in the index images displayed on the monitor 7 in real time.

The image processing condition determining means 6 outputs to the processing means 10 either the image processing conditions as they are, or a 3DLUT generated therein based on the image processing conditions, depending on the number Y0 (or Y0') of pixels in the image represented by the image data S0 (or S0') included in the setting information H0 for setting the image processing conditions used for carrying out the tone conversion processing and the color correction processing on the image data S0 (or S0'). When the image processing is carried out on the image data, the image processing is generally carried out on each of the pixels by using the image processing conditions that have been determined, or by generating the 3DLUT based on the image processing conditions that have been determined. In the image output apparatus in this embodiment, the image processing condition determining means 6 compares the number Y0 (or Y0') of the pixels of the image represented by the image data S0 (or S0') with the number of lattice points in the 3DLUT, in order to shorten processing time. In the case where the number Y0 (or Y0') of the pixels is larger than the number of lattice points, the 3DLUT is generated and output to the processing means 10. On the other hand, if the number Y0 (or Y0') of the pixels is equal to or smaller than the number of lattice points, the image processing conditions are output to the processing means 10 as they are, and the 3DLUT is not generated. Hereinafter, the image processing condition determining means 6 will be explained in detail, with reference to FIG. 2.

Figure 2:
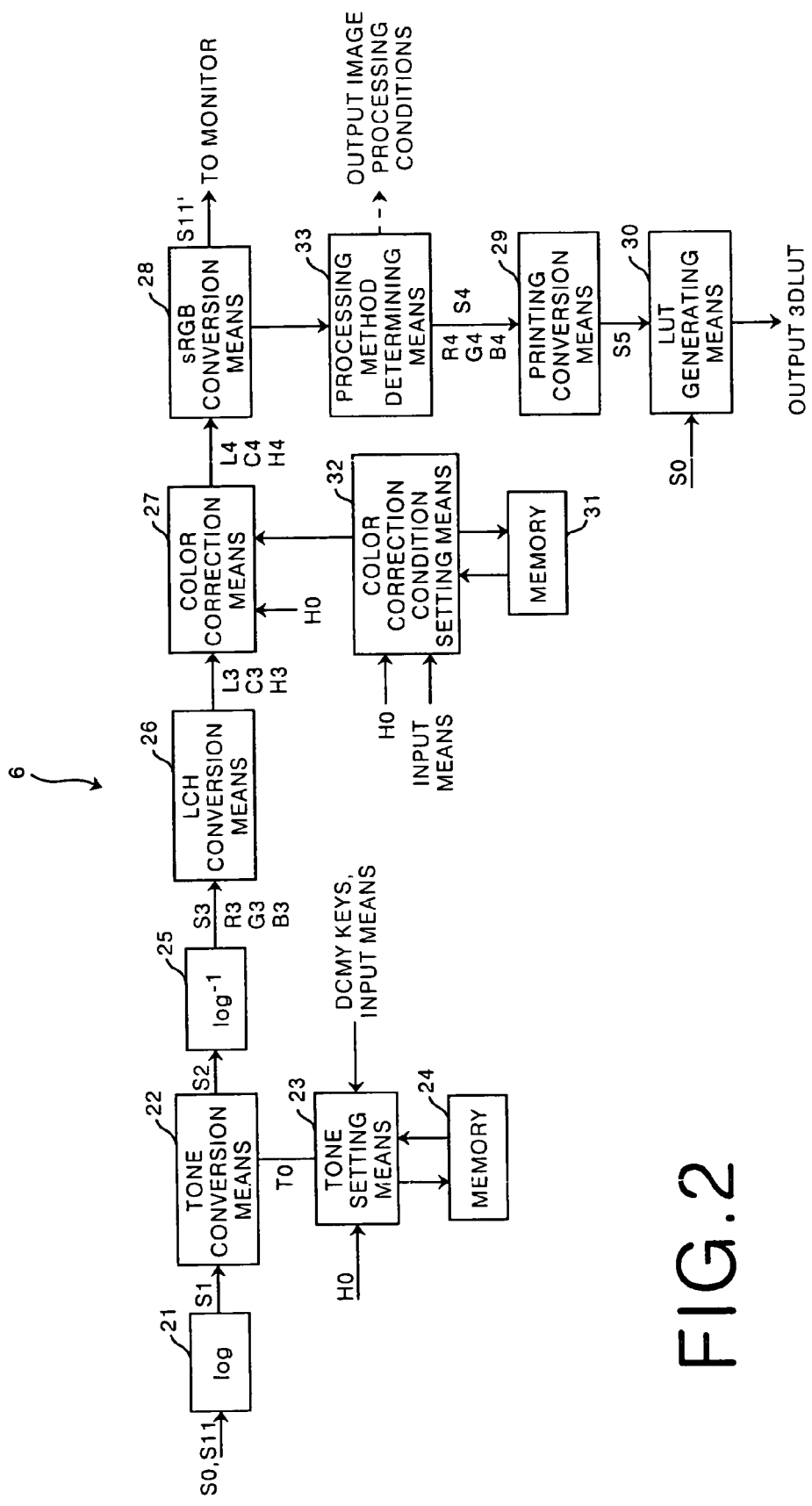
FIG. 2 is a block diagram showing a configuration of image processing condition determining means.

FIG. 2 is a block diagram showing a configuration of the image processing condition determining means 6. In the case where the image data S0 comprise the RGB color data having 8 bits each, $256^3$ data will be necessary if a 3DLUT for converting all the data is generated. Consequently, generation of such a 3DLUT becomes time-consuming. Therefore, in this embodiment, the number of bits of the color data R0, G0, and B0 is reduced to generate the 3DLUT having 33 data for each of the RGB colors, namely, 0, 7, 15, ..., 247, and 255. In other words, in this embodiment, the number of lattice points in the 3DLUT is $(2^n/8+1)$ where n is the number of output bits of the image data S0.

As shown in FIG. 2, the image processing condition determining means 6 comprises logarithmic conversion means 21 for obtaining image data S1 by carrying out logarithmic conversion on antilogarithms R0', G0', and B0' found from the image data S0 or the image data S0' having the reduced number of bits according to ITU-R BT.709 (a standard for 8-bit data: REC. 709) for example by using Equations (1)-(3) below, tone conversion means 22 for obtaining image data S2 by carrying out tone conversion processing on the image data S1, tone setting means 23 for setting the tone conversion tables T0 used for the tone conversion by the tone conversion means 22, a memory 24 storing a plurality of reference tone setting menus, model tone setting menus corresponding to models of digital cameras, and customized tone processing condition menus (customized model tone processing conditions and customized reference tone processing conditions) set for respective users as will be explained later, inverse logarithmic conversion means 25 for obtaining image data S3 comprising color data R3, G3, and B3 by carrying out inverse logarithmic conversion on the image data S2, LCH conversion means 26 for converting the color data R3, G3, and B3 comprising the image data S3 into data L3, C3 and H3 representing lightness L*, chroma C*, and hue angle HA, color correction means 27 for obtaining color corrected data L4, C4, and H4 by carrying out color correction processing on the data L3, C3, and H3, sRGB conversion means 28 for obtaining color corrected image data S4 comprising color data R4, G4, and B4 by converting the color corrected data L4, C4 and H4 into an sRGB color space which is a color space for monitor display, printing conversion means 29 for obtaining print image data S5 by converting the color corrected image data S4 into a color space for printing, LUT generating means 30 for generating the 3DLUT based on the image data S0 and the print image data S5, and processing method determining means 33 for determining whether the image processing conditions or the 3DLUT is output to the processing means 10. The color correction means 27 is connected to color correction condition setting means 32 for setting the color correction conditions used by the color correction means 27. The color correction condition setting means 32 reads the color correction conditions from a memory 31 storing a plurality of reference color correction condition setting menus, model color correction condition setting menus corresponding to models of digital cameras, and customized color correction condition menus (customized model color correction condition menus and customized reference color correction condition menus set for respective users as will be explained later), based on the setting information H0 and an input from the input means 8. The color correction condition setting means 32 customizes the color correction conditions if necessary, and inputs the color correction conditions to the color correction means 27.

$Pr=R0/255$ $Pg=G0/255$ (1)

$Pb=B0/255$ $R0'=((Pr+0.099)/1.099)^{2.222}$ $G0'=((Pg+0.099)1.099)^{2.222}$ (if $Pr, Pg, Pb \geq 0.081$)

$B0'=((Pb+0.099)/1.099)^{2.222}$ (2)

$R0'=Pr/4.5$ $G0'=Pg/4.5$ (if $Pr, Pg, Pb<0.081$) (3)

$B0'=Pb/4.5$

For the image data S0 or S0' whose number of bits is 9 or larger, the logarithmic conversion means 21 obtains the antilogarithms R0', G0', and B0' according to Equations (1') to (3) below, and obtains the image data S1 by carrying out logarithmic conversion thereon:

$Pr=R0/(2^n-1)$ $Pg=G0/(2^n-1)$ (1')

$Pb=B0/(2^n-1)$ $R0'=((Pr+0.099)/1.099)^{2.222}$ $G0'=((Pg+0.099)1.099)^{2.222}$ (if $Pr, Pg, Pb \geq 0.081$)

$B0'=((Pb+0.099)/1.099)^{2.222}$ (2)

$R0'=Pr/4.5$ $G0'=Pg/4.5$ (if $Pr, Pg, Pb<0.081$) (3)

$B0'=Pb/4.5$ where n is the number of bits of the image data S0 or S0'.

As has been described above, the memory 24 stores the menus for setting the reference tones for the standard situation, cloudy weather, backlight, and flash photographing, as well as the model tone setting menus corresponding to models of digital camera, in addition to the customized tone processing condition menus set for respective users (the customized model tone processing conditions and the customized reference tone processing conditions). FIG. 3B shows an example of the model tone setting menus. As shown in FIG. 3B, model tone processing conditions for a digital camera A comprise a model tone correction curve C200 for correcting a tone characteristic of the model for all RGB colors, and model tone correction curves C210, C220, and C230 for correcting tone characteristics of the model for R, G, and B, respectively. As in the case of customizing the reference tone curves described above, the model tone correction curve for all RGB colors, R only, C only, or B only can be set as desired by correcting the curve C200, C210, C220, or C230 in the model tone setting menu shown in FIG. 3B by using the input means 8. Adjustment of density and gray balance can also be achieved by correcting the model tone correction curves C210, C220 and C230 for R, G, and B, respectively.

Figure 4:
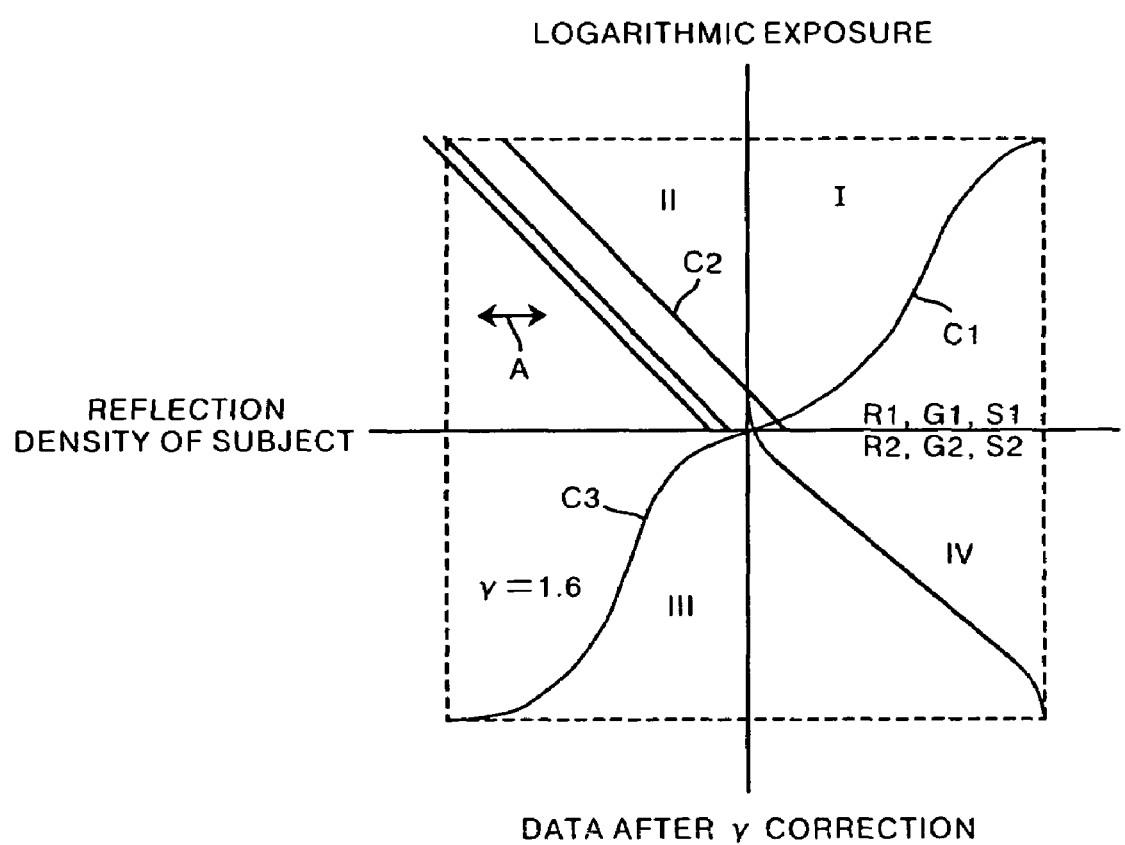
FIG. 4 is a diagram explaining setting of a tone conversion table.

The tone conversion tables T0 are set in the tone setting means 23 for converting tones of the image data S1 in the following manner. FIG. 4 is a diagram for explaining how the tone conversion tables T0 are set. The tone conversion tables T0 generate the color data R2, G2, and B2 comprising the image data S2 by the tone conversion of the color data R1, G1, and B1 comprising the image data S1 according to first to fourth quadrants in FIG. 4. In the tone setting means 23, the tone conversion tables T0 are set for R, G, and B. First, the setting information H0 is input to the tone setting means 23, and one of the model tone setting menus corresponding to the model of the digital camera is read from the memory 24 based on information on the model of the digital camera included in the setting information H0. Meanwhile, the reference tone setting menu for the standard situation is read from the memory 24 as a default of the reference tone setting menu. However, if reading the reference tone setting menu for cloudy weather or for backlight or for flash photographing is instructed from the input means 8, the corresponding menu is read from the memory 24.

A model tone correction curve C1 for correcting the model tone characteristics of the digital camera is set in the first quadrant, as shown in FIG. 4. Since a quality of a reproduced image varies depending on a model or a manufacturer of a digital camera, the model tone correction curve C1 corrects the tone characteristics of the individual camera in order to obtain images of uniform quality regardless of the model thereof. As in the example of the model tone setting menu shown in FIG. 3B, the default model tone correction curves C200, C210, C220, and C230 have been generated corresponding to the model of the digital camera in order to absorb the model tone characteristics of the digital camera, and the model tone correction curve obtained by correcting (customizing) the model tone correction curves as desired is used as the model tone correction curve C1. In the case where gray balance is not changed, the same model tone correction curve C1 is used for the respective RGB colors. However, if the gray balance is changed, the model tone correction curve C1 becomes different for each of the RGB colors. By converting the color data R1, G1 and B1 based on the tone curve C1, a logarithmic exposure value compensating the tone characteristics of the camera can be obtained.

A line C2 for correcting exposure is set in the second quadrant. The line C2 for exposure correction is basically a line passing through the origin. By translating the line C2 in directions shown by an arrow A based on the correction amount for white balance and exposure included in the setting information H0, the exposure is corrected. Data representing reflection density of the subject on which the AE/AWB processing appropriate for printing has been carried out can be obtained by the line C2.

A reference tone correction curve C3 is set in the third quadrant. The reference tone correction curve C3 is set in the following manner. In the reference tone setting menu that has been read as shown in FIG. 3A, the reference tone correction curves C100, C110, C120, and C130 are corrected as desired by using the input means 8, and the reference tone correction curve obtained by this correction is set as the reference tone correction curve C3. As in the case of the model tone correction curve C1 described above, the same reference tone correction curve C3 is used for the RGB colors in the case where the gray balance is not changed. If the gray balance is changed, the reference tone correction curve C3 becomes different for each of the RGB colors. In this example, the reference tone correction curve C3 for the standard situation is set. The reference tone correction curve C3 has an "S"-like shape and a middle portion thereof corresponds to the case of $\gamma=1.6$. In this embodiment, the conversion by the reference tone correction curve C3 is called $\gamma$ conversion. By using the tone curve C3, density data appropriate for printing can be obtained.

A tone curve C4 for correcting tones of the highlight area and the shadow area of the image to become nonlinear is set in the fourth quadrant. Correction amounts for the tone curve C4 are determined by the correction amounts of the highlight area and the shadow area included in the setting information H0. By using the tone curve C4, the color data R2, G2 and B2 comprising the image data S2 can be obtained.

The tone conversion tables T0 are changed by an input from the input means 8 or from the DCMY keys 9. C, M, and Y of the index images shown on the monitor 7 change by pressing down the DCMY keys 9. The changes in C, M, and Y are converted into the changes of densities of R, G, and B, and the tone conversion tables T0 are changed according to the changes in the densities. In other words, the changes of RGB density are predetermined depending on how many times the DCMY keys 9 are hit, and the densities are changed according to pressing of the DCMY keys 9. More specifically, by translating the line C2 in the directions shown by the arrow A in the second quadrant based on how many times the DCMY keys are hit, the densities of R, G, and B are changed. Since the model tone correction curves and/or the reference tone correction curves are customized by the input from the input means 8, the curve C1 in the first quadrant or the curve C3 in the third quadrant is changed. By changing the line C2 and the curves C1 and C3, the tone conversion tables T0 are set. The corrected (customized) model tone correction curves and the customized reference tone correction curves are stored in the memory 24 as "cloudy-weather reference tone correction curves for user A" or "cloudy-weather model tone correction curves for a digital camera X of user A", for example.

The tone conversion means 22 obtains the image data S2 by converting the image data S1 based on the tone conversion tables T0 set by the tone setting means 23.

Processing in the logarithmic conversion means 21, the tone conversion means 22, and the inverse logarithmic conversion means 25 is carried out in an RGB color space.

The LCH conversion means 26 converts the image data S3 from the RGB color space into an L*a*b* color space, and obtains the data L3, C3, and H3 representing the lightness L*, the chroma C*, and the hue angle HA. Hereinafter, this conversion will be explained. Since the image data S0 obtained by the digital camera are according to ITU-R BT.709 (REC 709), the color data R3, G3, and B3 comprising the image data S3 are converted into CIE1931 tristimulus values X, Y, and Z based on the following Equation (4):

$$\begin{matrix} X \\ Y \\ Z \end{matrix} = |A| \begin{matrix} R3 \\ G3 \\ B3 \end{matrix} \quad (4)$$

Here, the matrix |A| is a matrix for converting the color data R3, G3, and B3 into the tristimulus values X, Y, and Z, and the following values can be used, for example:

$$|A| = \begin{matrix} 0.4124 & 0.3576 & 0.1805 \\ 0.2126 & 0.7152 & 0.0722 \\ 0.0193 & 0.1192 & 1.0571 \end{matrix} \quad (5)$$

Instead of the matrix |A|, a look-up table may be used to find the tristimulus values X, Y, and Z.

CIE1976 L* (=L3), C* (=C3), and HA (=H3) are found from the tristimulus values X, Y, and Z, based on Equations (6)~(8) below:

$$a^* = 500\{f(X/Xn) - f(Y/Yn)\}$$

$$b^* = 200\{f(Y/Yn) - f(Z/Zn)\} \quad (6)$$

$$L^* = 116(Y/Yn)^{1/3} - 16 \text{ (if } Y/Yn > 0.008856)$$

$$L^* = 903.25(Y/Yn) \text{ (if } Y/Yn \leq 0.008856)$$

If X/Xn, Y/Yn, Z/Zn > 0.008856, $$f(a/an) = (a/an)^{1/3} (a = X, Y, Z)$$

If X/Xn, Y/Yn, Z/Zn ≤ 0.008856, $$f(a/an) = 7.787(a/an) + 16/116$$

Xn, Yn, and Zn are tristimulus values for white and can be substituted by tristimulus values corresponding to CIE-D65 (a light source whose color temperature is 6500 K).

$$C^* = (a^{*2} + b^{*2})^{1/2} \quad (7)$$

$$HA = \tan^{-1}(b^*/a^*) \quad (8)$$

The color correction means 27 corrects lightness, chroma and hue for eleven colors, namely R, G, B, C, M, Y, YellowGreen (YG), BlueSky (BS), a skin color SK(HL) in the highlight area, a skin color SK(MD) having an intermediate density, and a skin color SK(SD) in the shadow area. More specifically, the corrected data L4, C4, and H4 are obtained by correcting the data L3, C3 and H3 according to Equations (9)~(11) below:

$$L4 = L3 - \Delta L \quad \Delta L = \Sigma LPi \; Wi + \Sigma LPj \; Wj + \Delta l \; Wj \quad (9)$$

$$C4 = C3 - \Delta C \quad \Delta C = \Sigma CPi \; Wi + \Sigma CPj \; Wj + \Delta c \; Wj \quad (10)$$

$$H4 = H3 - \Delta H \quad \Delta H = \Sigma HPi \; Wi + \Sigma HPj \; Wj + \Delta h \; WJ \quad (11)$$

where i: R, G, B, C, M, Y, YG, BS,
j: SK(HL), SK(MD), SK(SD),
LPi, LPj: correction degrees in the lightness,
CPi, CPj: correction degrees in the chroma,
HPi, HPj: correction degrees in the hue,
Wi, Wj: intensity functions,
Δl: a lightness change caused by tone correction,
Δc: a chroma change caused by tone correction, and
Δh: a hue change caused by tone correction.

The lightness correction degrees LPi and LPj, the chroma correction degrees CPi and CPj, and the hue correction degrees HPi and HPj are provided by the color correction condition setting means 32. The color correction condition setting means 32 reads a desired one of the reference color correction condition menus (or the customized reference color correction condition menus set for respective users) and one of the model color correction condition menus corresponding to the model of the digital camera (or the customized model color correction condition menus set for respective users) from the memory 31. If necessary, the color correction condition setting means 32 selects and customizes the color correction conditions included in the menus that have been read. When the setting information H0 is input to the color correction condition setting means 32, the model color correction condition setting menu corresponding to the model of the digital camera is read from the memory 31 based on the information on the model of the digital camera included in the setting information H0. The model color correction condition setting menu has a plurality of model color correction conditions as shown FIG. 5B, for example. As shown in FIG. 5B, the model color correction conditions comprise color correction parameters corresponding to the model of the digital camera, for R, G, B, C, M, Y, YG, BS, SK(HL), SK(MD), and SK(SD). By selecting a desired one of the model color correction conditions from the model color correction condition setting menu for the specific model and by correcting (customizing) the selected condition by using the input means 8, the color correction parameters can be set for the model as desired. Meanwhile, a reference color correction condition setting menu for the standard situation is read from the memory 31 as a default menu. In the case where reading a reference color correction condition setting menu for cloudy weather or backlight or flash photographing is specified by the input means 8, a color correction condition setting menu therefor is read from the memory 31. The reference color correction condition setting menu has a plurality of reference color correction conditions. FIG. 5A shows an example of the reference color correction conditions. As shown in FIG. 5A, the reference color correction conditions comprise color correction parameters for R, G, B, C, M, Y, YG, BS, SK (HL), SK(MD), and SK(SD) that are common among all models of digital camera. By selecting a desired one of the reference color correction conditions from the reference color correction condition menu and by correcting (customizing) the selected condition by using the input means 8, the reference color correction condition parameters can be set as desired. The customized reference color correction conditions and the customized model color correction conditions are stored in the memory 31 as "a cloudy-weather reference color correction condition menu for user A" and "cloudy-weather model color correction condition menu for digital camera X of user A", for example. When one of the customized color correction condition menus is selected by the input means 8, the corresponding customized reference color correction conditions and the corresponding customized model color correction conditions are read from the memory 31 and input to the color correction means 27.

Since values representing how much the lightness, the chroma and the hue need to be changed are set in the reference color correction condition menu (or the customized reference color correction condition menu) and the model color correction condition menu (or the customized model color correction condition menu) that have been read, the color correction means 27 sets the lightness correction degrees LPi and LPj, the chroma correction degrees CPi and CPj, and the hue correction degrees HPi and HPj in Equations (9)~(11) according to the values set by the color correction condition setting means 32. Each of the correction degrees of each color is obtained as a sum of the corresponding values in the reference color correction condition menu and the model color correction condition menu.

The intensity functions are found according to Equation (12) below:

$$Wi = F(d)$$

$$d = ((Li - L3)^2 + (Ci - C3)^2 + (Hi - H3)^2)^{1/2} \qquad (12)$$

Figure 6:
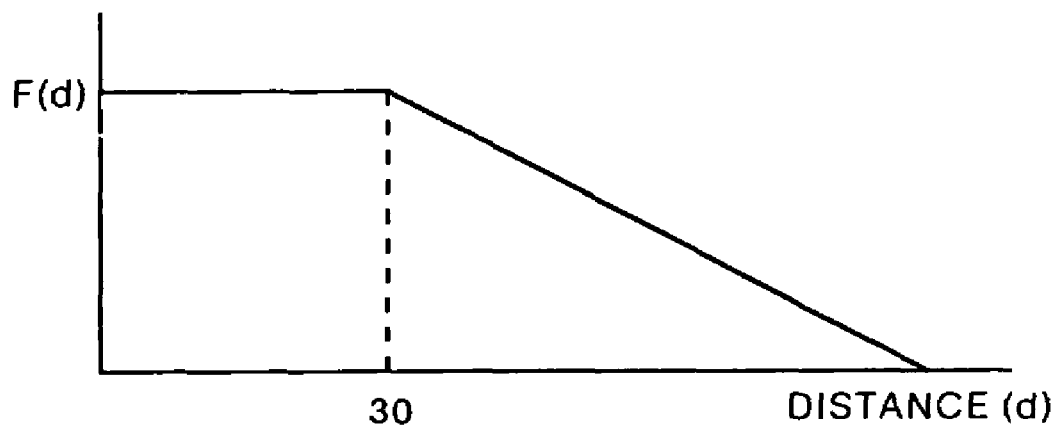
FIG. 6 is a diagram showing an example of an intensity function.

Li, Ci, and Hi are center colors of R, G, B, C, M, Y, YG, and BS. For R, G, B, C, M, and Y, the center colors Li, Ci, and Hi refer to colorimetric values of these colors of Macbeth Color Checker registered by Macbeth A Division of Kallmorgen Co. For YG and BS, the center colors Li, Ci and Hi refer to average colorimetric values of vegetation and sky in an image represented by the image data S0. F(d) is a function such that the function is constant up to a predetermined value (30 in this example) of distance d between each of the center colors Li, Ci, and Hi and the data L3, C3, and H3, and decreases if d becomes larger than the predetermined value, as shown in FIG. 6.

Figure 7:
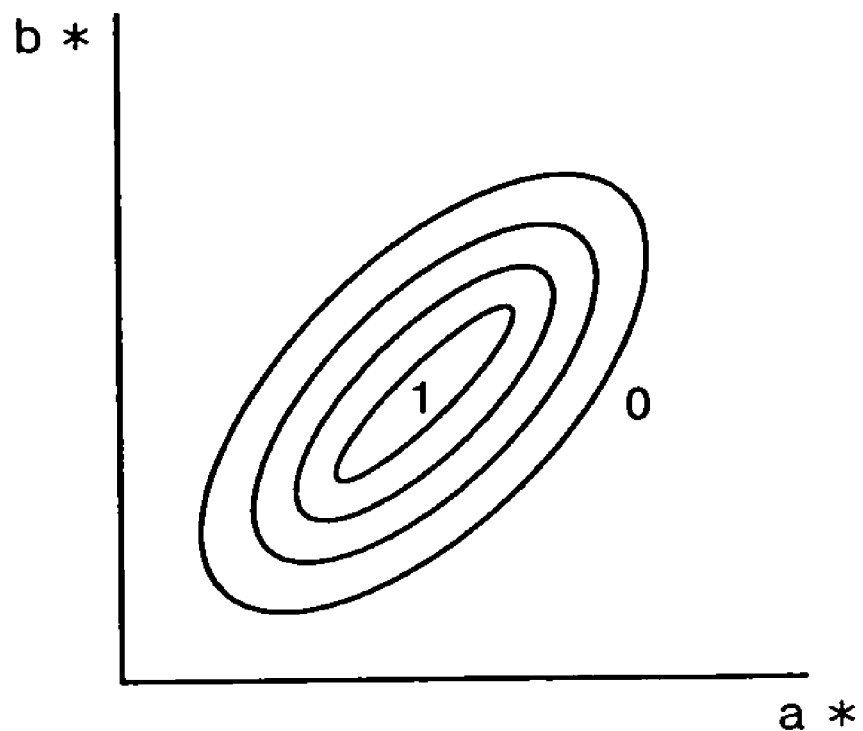
FIG. 7 is a diagram showing an example of an intensity function for skin color.

Meanwhile, statistical distribution ranges of the skin colors SK(HL), SK(MD) and SK(SD) of the image represented by the image data S0 in an L*a*b* color space are found. The skin color function W(j) [$0 \leq Wj \leq 1$] whose value is small in a peripheral area and large at a center area is set in the distributions, as shown in FIG. 7.

$\Delta l$, $\Delta c$, and $\Delta h$ represent how much the lightness, chroma, and the hue of the skin colors are changed according to the nonlinear tone correction set in the fourth quadrant in FIG. 4, and are found in the following manner. Based on the RGB values of the image data after the γ conversion in the third quadrant and based on the RGB values (R2, G2, B2) of the image data after the nonlinear tone correction in the fourth quadrant, $\Delta L^*$, $\Delta C^*$, and $\Delta HA$ representing how much the lightness L*, the chroma C*, and the hue angle HA are changed before and after the nonlinear tone correction are found according Equations (4)~(8). $\Delta L^*$, $\Delta C^*$, and $\Delta HA$ are multiplied by the intensity function Wj shown in FIG. 7 as in Equations (13)~(15) below, to obtain $\Delta l$, $\Delta c$, and $\Delta h$:

$$\Delta l = \Delta L^* \times Wj \qquad (13)$$

$$\Delta c = \Delta C^* \times Wj \qquad (14)$$

$$\Delta h = \Delta HA \times Wj \qquad (15)$$

The sRGB conversion means 28 finds a* and b* after the correction by solving Equations (7) and (8) by using the corrected data L4, C4 and H4. The sRGB conversion means 28 then finds tristimulus values X5, Y5, and Z5 after the correction by solving Equation (6) by using a*, b* after the correction and by using L*. The tristimulus values X5, Y5, and Z5 are then converted into the color data R4', G4' and B4' according to Equation (16) below:

$$\begin{pmatrix} R4' \\ G4' \\ B4' \end{pmatrix} = |A|^{-1} \begin{pmatrix} X5 \\ Y5 \\ Z5 \end{pmatrix} \qquad (16)$$

The color data R4, G4, and B4 are then found by using the following Equation (17), and the data are used as the color corrected image data S4 in the sRGB color space for monitor display:

$$R4 = 255 \times (1.055 R4'^{1.0/2.4} - 0.055)$$

$$G4 = 255 \times (1.055 G4'^{1.0/2.4} - 0.055)$$

$$B4 = 255 \times (1.055 B4'^{1.0/2.4} - 0.055)(\text{if } 0.00304 \leq R4', G4', B4' \leq 1)$$

$$R4 = 255 \times 12.92 R4'$$

$$G4 = 255 \times 12.92 G4' \text{ (if } 0 \leq R4', G4', B4' < 0.00304)$$

$$B4 = 255 \times 12.92 B4' \qquad (17)$$

The processing method determining means 33 calculates the number of lattice points of the 3DLUT used for the tone conversion and the color correction of the image data S0, by using the number of bits of the image data S0. The calculated number of lattice points of the 3DLUT is compared with the number Y0 (or the number Y0' in the case where the image data S0 have been reduced) of pixels of the image represented by the image data S0. If the number of lattice points is equal to or larger than the number Y0 (or Y0') of pixels, the 3DLUT is not generated and the image processing conditions comprising the tone conversion tables T0 and the color correction conditions are output to the processing means 10 (the procedure shown by a dashed line). On the other hand, if the number of the lattice points is smaller than the number Y0 (or Y0') of the pixels, the procedure advances to processing to generate the 3DLUT (processing by the printing conversion means 29 and the LUT generating means 30).

The printing conversion means 29 obtains the print image data S5 by converting the color corrected image data S4 according to a 3DLUT for converting the color corrected image data S4 in the sRGB color space into a color space for printing.

The LUT generating means 30 finds a relationship between the color data R0, G0, and B0 comprising the image data S0 or the image data S0' (having the reduced number of bits) and the color data R5, G5, and B5 comprising the print image data S5 for each of RGB colors, and uses the relationship as the 3DLUT having $33^3$ data to be output to the processing means 10.

The index image data S11 are also input to the image processing condition determining means 6, and the tone conversion processing and the color correction processing is carried out thereon. The image data are converted into the sRGB color space by the sRGB conversion means 29, and output to the monitor 7 as the index image data S11' after the tone conversion processing and the color correction processing.

The 3DLUT or the image processing conditions are input from the 3DLUT generating means 6 in FIG. 1 to the processing means 10. The processing means 10 converts the image data S0 (or S0') to the converted image data S12 according to the 3DLUT if the 3DLUT is received. At this time, since the 3DLUT comprises the $33^3$ data, color data comprising the converted image data S12 are found by volume interpolation or area interpolation of the 3DLUT, as has been described in Japanese Unexamined Patent Publication No. 2(1990)-87192, for example. On the other hand, if the processing means 10 receives the image processing conditions comprising the tone conversion tables T0 and the color correction conditions, the tone conversion processing and the color correction processing is carried out on each of the pixels of the image data S0 (or S0') by using the image processing conditions, and the converted image data S12 for printing are obtained.

The number of pixels of the digital camera that obtained the image data S0 varies, and may be smaller or larger than the number of pixels necessary for printing. Therefore, if the number of pixels of the image represented by the image data S0 is equal to or larger than the number of pixels necessary for printing, the reduction means 11 reduces the image data S0 and obtains the reduced image data S0'. The reduced image data S0' are converted into the converted image data S12. On the other hand, if the number of pixels is smaller than the number of pixels necessary for printing, the converted image data S12 obtained by the processing means 10 are enlarged by the enlargement means 12 and the enlarged image data S12' are obtained.

The sharpness processing means 13 carries out sharpness processing on the converted image data S12, or on the enlarged image data S12' according to Equation (18) below, and obtains the processed image data S13. In Equation (18), the sharpness processing is carried out on the converted image data S12.

$$S13 = S12 + \beta(S12 - S12us) \quad (18)$$

where S12us is unsharp image data of the converted image data S12 and $\beta$ is an enhancement factor.

The enhancement factor $\beta$ varying with a reduction ratio used by the reduction means 11 or with an enlargement ratio used by the enlargement means 12 is provided as shown in FIG. 8 so that the sharpness gain can be controlled as desired. As in the case of the tones and the colors, a reference gain and a gain depending on the model of the digital camera may also be controlled.

Figure 9:
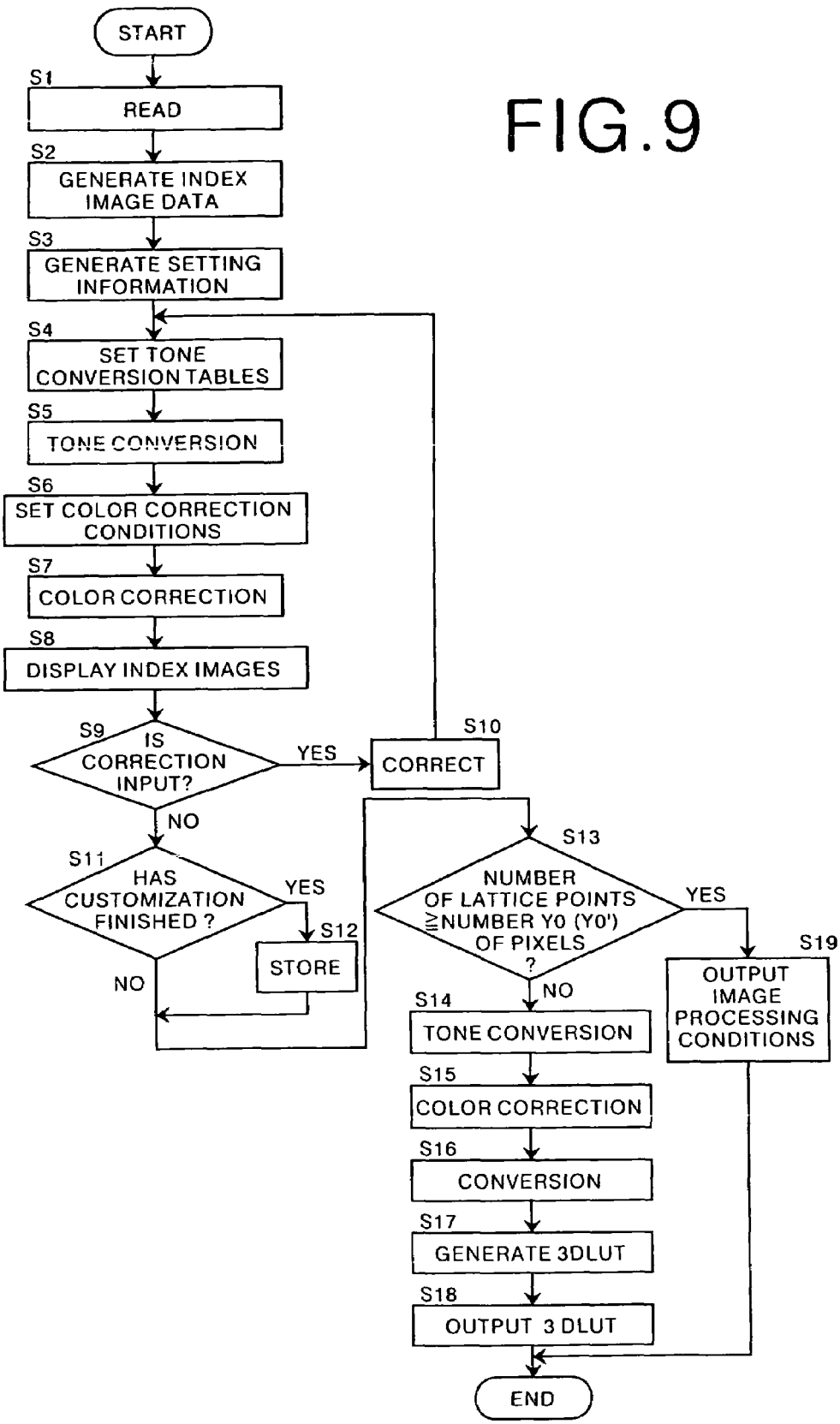
FIG. 9 is a flow chart showing operation of the image processing apparatus in the embodiment.

Operation of the image processing apparatus in this embodiment will be explained next. FIG. 9 is a flow chart showing the operation of the image processing apparatus in this embodiment. The image data S0 obtained by photographing with the digital camera are read from the memory card 2 by the reading means 3 (Step S1). The image data S0 read from the memory card 2 are subjected to the reduction processing by the reduction means 11 if necessary. The index image generating means 4 generates the index image data S11 representing the index images of the image data S0 (Step S2), and inputs the index image data S11 to the image processing condition determining means 6. Meanwhile, the setting information generating means 5 generates the setting information H0 based on the image data S0 or the reduced image data S0' (Step S3), and inputs the setting information H0 to the image processing condition determining means 6.

The tone setting means 23 of the image processing condition determining means 6 sets the tone conversion tables T0 for converting the image data S0 (or S0') according to the setting information H0, the desired reference tone correction curves (or the customized reference tone correction curves) selected by using the input means 8 from the memory 24 and the model tone correction curves (or the customized model tone correction curves) stored in the memory 24 (Step S4), and the tone conversion means 22 carries out the tone conversion on the index image data S11 based on the tone conversion tables T0 (Step S5). The color correction conditions are then set based on the setting information H0, the reference color correction condition menu (or the customized reference color correction conditions) selected by the input means 8 from the memory 31, and the model color correction condition menu (or the customized model color correction conditions) corresponding to the model of the digital camera (Step S6). The index image data S11 are subjected to the color correction processing by the color correction means 27 based on the color correction conditions that have been set (Step S7), and displayed on the monitor 7 (Step S8). An operator views the index images, and, if necessary (Step S9: YES), corrects the tones and/or densities of the index images by an input from the input means 8 or the DCMY keys 9 or corrects the color correction conditions by an input from the input means 8 (Step S10). The procedure returns to Step S4 and the processing from Step S4 to Step S9, in which the tone conversion tables T0 are newly set for the corrected tones and/or densities and the index image data S11 are subjected to the tone conversion and the color correction processing according to the newly set tone conversion tables T0 and the color correction conditions in order to be displayed on the monitor 7, is repeated. The "correction" includes correction of the reference tone correction curves, the model tone correction curves, the reference color correction conditions, and the model color correction conditions. If no correction is carried out, or when the correction is completed, a result at Step S9 becomes negative, and the finally set tone conversion tables T0 and the color correction conditions are determined for the image data S0 (or S0'). When the reference tone correction curves, the model tone correction curves, the reference color correction conditions, and the model color correction conditions are corrected, the curves and the conditions after the correction are stored in the memory 24 (for the tone curves) and in the memory 31 (for the color correction conditions) by being related to a name including information of a user and a photographing condition.

The processing condition determining means 33 compares the number of lattice points of the 3DLUT calculated based on the number of bits of the image data S0 with the number Y0 (or Y0' in the case of reduction) of pixels in the image represented by the image data S0 (Step S13). If the number of lattice points of the 3DLUT is equal to or larger than the number Y0 (or Y0') of pixels (Step S13: YES), the image processing conditions (the tone conversion tables T0 and the color correction conditions) are input to the processing means 10 (Step S19). If the number of lattice points is smaller than the number Y0 (or Y0') of pixels (Step S13: NO), the procedure advances to the processing to generate the 3DLUT (Step S14~S17). In the processing to generate the 3DLUT, the tone conversion is carried out on the image data S0 (or S0') having the reduced number of bits according to the tone conversion tables T0 (Step S14), and the color correction is then carried out by using the color correction conditions (Step S15). The conversion to the sRGB color space and the conversion to the color space for printing are also carried out (Step S16), and the print image data S5 are obtained. The LUT generating means 30 generates the 3DLUT (Step S17) by finding the relationship between the image data S0 (or S0') having the reduced number of bits and the print image data S5 for each of the RGB colors. The 3DLUT is output to the processing means 10 (Step S18).

As has been described above, the processing means 10 obtains the converted image data S12 by converting the image data S0 (or S0') according to the 3DLUT and by carrying out the interpolation processing on the 3DLUT, if the 3DLUT is input thereto. However, if the image processing conditions comprising the tone conversion tables T0 and the color correction conditions are input to the processing means 10, the processing means 10 obtains the converted image data S12 by carrying out the tone conversion processing and the color correction processing on each of the pixels of the image data S0 (or S0') according to the image processing conditions, and the converted image data S12 are obtained.

After the image data S0 read from the memory card 2 are converted by the processing means 10, the enlargement processing by the enlargement means 12 is carried out if necessary. The sharpness processing is then carried out by the sharpness processing means 13, and the printer 14 outputs the image data as the print P.

The sharpness gain in the sharpness processing is also controllable.

What is claimed is:

1. An image processing method for obtaining processed image data by carrying out image processing on image data obtained by a digital camera according to default processing conditions, which are processing conditions common for all models of digital camera, regardless of a model of each digital camera, for (1) modifying features and characteristics of the image represented by the image data and (2) processing conditions corresponding to a model of the digital camera, the image processing method comprising the step of:

customizing the default processing conditions and/or the processing conditions corresponding to the model of the digital camera;

creating a menu that lists various models of digital cameras, where selection of a model of digital camera from the menu automatically modifies the default processing conditions to the customized processing conditions created for the selected model of digital camera; and performing image processing by determining the image processing conditions for tone conversion and color correction based on the default processing conditions and/or the processing conditions corresponding to the model of digital camera, the determination including the steps of:

converting red (R), green (G), and blue (B) data of said image data by logarithmetic conversion;

modifying the converted logarithmetic R,G,B data by tone processing the converted logarithmetic R,G,B data using processing conditions associated with the default processing conditions and/or the processing conditions corresponding to the model of digital camera;

converting the tone corrected image data by performing lightness (L), chroma (C), and hue angle (H) conversion; and modifying the LCH data by color correction processing to obtain color corrected image data.

2. An image processing method as defined in claim 1, wherein the processing conditions corresponding to the model of the digital camera include at least one of tone correction processing conditions, density correction processing conditions, and color correction processing conditions each corresponding to the model of the digital camera.

3. An image processing method as defined in claim 1, wherein the default processing conditions are customized by selection from customized default processing condition menus generated in advance.

4. An image processing method as defined in claim 1, wherein the processing conditions corresponding to the model of the digital camera are customized by selection from customized model processing condition menus generated in advance.

5. An image processing apparatus for obtaining processed image data by carrying out image processing on image data obtained by a digital camera according to, (1) for modifying features and characteristics of the image represented by the image data default processing conditions, which are processing conditions common for all models of digital camera, regardless of a model of each digital camera and (2) processing conditions corresponding to a model of the digital camera, the image processing apparatus comprising:

default processing condition setting means for customizing the default processing conditions;

model processing condition setting means for customizing the processing conditions corresponding to the model of the digital camera, where a menu is created that lists various models of digital camera, where selection of a model of digital camera from the menu automatically modifies the default processing conditions to the customized processing conditions created for the selected model of digital camera; and image processing means for carrying out the image processing based on the default processing conditions set by the default processing condition setting means and the processing conditions corresponding to the model of the digital camera set by the model processing condition setting means, the image processing means including an image processing condition determination means which includes:

logarithmetic conversion means for converting red (R), green (G), and blue (B) data of said image data by logarithmetic conversion;

tone processing means for modifying the converted logarithmic R,G,B data by tone processing the converted logarithmic R,G,B data using processing conditions associated with the default processing conditions and/or the processing conditions corresponding to the model of digital camera;

LCH conversion means for convening the tone corrected image data by performing lightness (L), chroma (C), and hue angle (H) conversion; and color correction means for modifying the LCH data by color correction processing to obtain color corrected image data.

6. An image processing apparatus as defined in claim 5, further comprising:

processing condition management means for providing a name to the default processing conditions set by the default processing condition setting means and/or the processing conditions for the model set by the model processing condition setting means and for storing the default processing conditions and/or the processing conditions for the model in relation to the name thereof; and processing condition reading means for reading the default processing conditions and/or the processing conditions for the model managed by the processing condition management means and for providing the conditions that have been read to the image processing means.

7. An image processing apparatus as defined in claim 5, wherein the model processing condition setting means customizes at least one of tone correction processing conditions, density correction processing conditions, and color correction processing conditions each corresponding to the model of the digital camera.

8. An image processing apparatus as defined claim 5, wherein the default processing condition setting means sets the default processing conditions by selection from customized default processing condition menus generated in advance.

9. An image processing apparatus as defined in claim 5, wherein the model processing condition setting means sets the processing conditions corresponding to the model of the digital camera by selection from customized model processing condition menus generated in advance.

10. A computer-readable recording medium storing a program to cause a computer to execute an image processing method for obtaining processed image data by carrying out image processing on image data obtained by a digital camera according to, (1) for modifying features and characteristics of the image represented by the image data default processing conditions, which arc processing conditions common for all models of digital camera, regardless of a model of each digital camera and (2) processing conditions corresponding to a model of the digital camera, the program comprising the procedure of:

customizing the default processing conditions and/or the processing conditions corresponding to the model of the digital camera;

creating a menu that lists various models of digital cameras, where selection of a model of digital camera from the menu automatically modifies the default processing conditions to the customized processing conditions created for the selected model of digital camera; and performing image processing by determining the image processing conditions for tone conversion and color correction based on the default processing conditions and/or the processing conditions corresponding to the model of digital camera, the determination including the steps of:

converting red (R), green (G), and blue (B) data of said image data by logarithmetic conversion;

modifying the converted logarithmic R,G,B data by tone processing the converted logarithmic R,G,B data using processing conditions associated with the default processing conditions and/or the processing conditions corresponding to the model of digital camera;

converting the tone corrected image data by performing lightness (L), chroma (C), and hue angle (II) conversion; and modifying the LCH data by color correction processing to obtain color corrected image data.

11. An image processing condition setting method for setting image processing conditions used for carrying out image processing on image data obtained by a digital camera for (1) modifying features and characteristics of the image represented by the image data default processing conditions, which are processing conditions common for all models of digital camera, regardless of a model of each digital camera and (2) processing conditions corresponding to a model of the digital camera, the image processing condition setting method comprising the step of:

customizing default processing conditions and/or processing conditions corresponding to a model of the digital camera;

creating a menu that lists various models of digital cameras, where selection of a model of digital camera from the menu automatically modifies the default processing conditions to the customized processing conditions created for the selected model of digital camera; and performing image processing based on the set image processing conditions by determining the image processing conditions for tone conversion and color correction based on the set processing conditions including the default processing conditions and/or the processing conditions corresponding to the model of digital camera, the determination including the steps of:

converting red (R), green (G), and blue (B) data of said image data by logarithmetic conversion;

modifying the converted logarithmic R,G,B data by tone processing the converted logarithmic R,G,B data using the processing conditions associated with the default processing conditions and/or the processing conditions corresponding to the model of digital camera;

converting the tone corrected image data by performing lightness (L), chroma (C), and hue angle (H) conversion; and modifying the LCH data by color correction processing to obtain color corrected image data.

* * * * *

UNITED STATES PATENT AND TRADEMARK OFFICE
CERTIFICATE OF CORRECTION

PATENT NO. : 7,379,096 B2  Page 1 of 1
APPLICATION NO. : 09/842922
DATED : May 27, 2008
INVENTOR(S) : Fumito Takemoto It is certified that error appears in the above-identified patent and that said Letters Patent is hereby corrected as shown below:

On the Title page, (73) change assignee as follows:
   Assignee: FUJIFILM CORPORATION**

Signed and Sealed this

Twentieth Day of January, 2009

JON W. DUDAS
*Director of the United States Patent and Trademark Office*